United States Patent
Hatta (10) Patent No.: US 11,376,803 B2
(45) Date of Patent: Jul. 5, 2022

(54) METHOD FOR MANUFACTURING FIBER REINFORCED RESIN MOLDED ARTICLE, AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/158,136

(22) Filed: Jan. 26, 2021

(65) Prior Publication Data

US 2021/0299979 A1 Sep. 30, 2021

(30) Foreign Application Priority Data

Mar. 25, 2020 (JP) .............................. JP2020-054101

(51) Int. Cl.
| | | |
|---|---|---|
| B29C 70/48 | (2006.01) | |
| B29C 70/54 | (2006.01) | |
| B29C 70/46 | (2006.01) | |
| B29K 63/00 | (2006.01) | |
| B29L 31/00 | (2006.01) | |
| B29K 307/04 | (2006.01) | |

(52) U.S. Cl.
CPC ............ B29C 70/54 (2013.01); B29C 70/462 (2013.01); B29C 70/48 (2013.01); B29K 2063/00 (2013.01); B29K 2307/04 (2013.01); B29L 2031/7156 (2013.01)

(58) Field of Classification Search
CPC ..... B29C 70/462; B29C 70/48; B29C 33/303; B29C 33/304; B29C 33/76
See application file for complete search history.

(56) References Cited

U.S. PATENT DOCUMENTS

| | | | | | |
|---|---|---|---|---|---|
| 2,098,395 | A | * | 11/1937 | Law | B29C 33/0038 425/233 |
| 2,859,936 | A | * | 11/1958 | Warnken | F01D 5/282 273/DIG. 7 |
| 3,028,284 | A | * | 4/1962 | Reeves | B29C 70/48 156/215 |
| 3,669,589 | A | * | 6/1972 | Bordat | B29D 99/0028 425/129.1 |
| 4,426,341 | A | * | 1/1984 | Tsuzuku | B29C 45/77 264/328.13 |

(Continued)

FOREIGN PATENT DOCUMENTS

| | | |
|---|---|---|
| JP | 2001-027678 A | 1/2001 |
| JP | 2005-199524 A | 7/2005 |
| JP | 2019-056415 A | 4/2019 |

*Primary Examiner* — Matthew J Daniels
(74) *Attorney, Agent, or Firm* — Finnegan, Henderson, Farabow, Garrett & Dunner, LLP (57) ABSTRACT

Provided is a method for manufacturing a fiber reinforced resin molded article capable of detecting a resin impregnation state in a fiber layer of a preform at a position corresponding to a resin flow end portion and uniformly impregnating the fiber layer of the preform with resin, and such a manufacturing device thereof. For example, when a relation between a resin pouring time and a pressure of resin detected by a pressure sensor satisfies a predetermined condition or when the pressure of resin detected by the pressure sensor is higher than or equal to a predetermined value, it is determined that the resin flow end portion of the preform is completely impregnated with resin.

5 Claims, 9 Drawing Sheets

(56) References Cited

U.S. PATENT DOCUMENTS

| | | | | |
|---|---|---|---|---|
| 5,023,041 A * | 6/1991 | Jones | B29C 33/0055 | 264/510 |
| 5,301,940 A * | 4/1994 | Seki | B29C 67/246 | 264/258 |
| 5,528,155 A * | 6/1996 | King | G01N 33/442 | 156/64 |
| 6,063,315 A * | 5/2000 | Keller | B29C 66/54 | 264/572 |
| 6,171,423 B1 * | 1/2001 | Murphy | B29C 49/24 | 156/244.14 |
| 6,565,793 B1 * | 5/2003 | Goldsworthy | B29C 53/582 | 264/516 |
| 6,955,784 B1 * | 10/2005 | Zanella | B29C 49/20 | 264/516 |
| 7,674,418 B2 * | 3/2010 | Matsumoto | B29C 70/446 | 425/389 |
| 8,696,967 B2 * | 4/2014 | Haimoff | B29C 45/14836 | 264/279.1 |
| 2003/0062654 A1 * | 4/2003 | Lamkin | A63B 60/06 | 264/250 |
| 2005/0258575 A1 * | 11/2005 | Kruse | B29C 70/086 | 264/573 |
| 2008/0264551 A1 * | 10/2008 | Wood | B29C 45/14786 | 156/172 |
| 2013/0099405 A1 * | 4/2013 | Kraemer | B29C 70/48 | 425/149 |
| 2013/0127092 A1 * | 5/2013 | Dauner | B29C 70/48 | 264/46.5 |
| 2014/0252006 A1 * | 9/2014 | Aylward | B29C 70/443 | 220/565 |
| 2015/0034233 A1 * | 2/2015 | Hatta | B29D 22/00 | 156/172 |
| 2019/0084249 A1 * | 3/2019 | Hatta | B29C 70/48 | |
| 2020/0376782 A1 * | 12/2020 | Uehara | D06M 10/001 | |

* cited by examiner

METHOD FOR MANUFACTURING FIBER REINFORCED RESIN MOLDED ARTICLE, AND MANUFACTURING DEVICE THEREOF

CROSS REFERENCE TO RELATED APPLICATIONS

The present application claims priority from Japanese patent application JP 2020-054101 filed on Mar. 25, 2020, the entire content of which is hereby incorporated by reference into this application.

BACKGROUND

Technical Field

The present disclosure relates to methods for manufacturing fiber reinforced resin molded articles, such as a high-pressure tank that is reinforced with fibers, and manufacturing devices thereof.

Background Art

Fuel cell vehicles include a high-pressure tank (hereinafter, simply may be called a tank) that stores fuel gas such as natural gas or hydrogen gas. Such a high-pressure tank is prepared as a fiber reinforced resin molded article that includes a hollow liner having a gas barrier property as a core member, and carbon fiber reinforced plastic or glass fiber reinforced plastic (hereinafter collectively called a fiber reinforced resin layer) that coats the liner. For lightweight, a hollow container made of resin is typically used as the liner.

High-pressure tanks have been conventionally manufactured by the filament winding (FW) method and the resin transfer molding (RTM) method. JP 2019-056415 A, for example, discloses a method for manufacturing a high-pressure tank by the RTM method. This manufacturing method places a preform in a mold, the preform including a liner defining the inner space of the high-pressure tank and a fiber layer formed on the outer surface of the liner, and rotates the preform in the mold in the circumferential direction about the central axis of the preform while injecting resin from a gate toward the preform placed in the mold.

SUMMARY

By the way, resin hardly enters into the fiber layer of the preform at a resin flow end portion located away from a gate (hereinafter this may be called a resin inlet), and thus it is hard to uniformly impregnate the fiber layer of the preform with resin. In addition, it is hard to detect the state of resin impregnation into the fiber layer of the preform (see, for example, JP 2001-027678 A, JP 2005-199524 A). This raises a problem that it is impossible to know whether the fiber layer of the preform at the position corresponding to the resin flow end portion is sufficiently impregnated with resin.

In view of the above problems, the present disclosure provides a method for manufacturing a fiber reinforced resin molded article capable of detecting a resin impregnation state in the fiber layer of the preform at the position corresponding to the resin flow end portion and uniformly impregnating the fiber layer of the preform with resin, and such a manufacturing device thereof.

According to one aspect of the present disclosure, there is disclosed a method for manufacturing a fiber reinforced resin molded article to form a preform including a fiber layer on an outer surface of a liner, impregnate the fiber layer of the preform with resin, and cure the resin, and the method includes: a step of preparing a mold having a movable core disposed therein, the movable core having a pressure sensor for detecting a pressure of resin flowing in the mold and being movable relative to the preform at a position facing a resin flow end portion of the preform; a step of placing the preform in the mold in a state where the movable core is pressed against the resin flow end portion of the preform; and a step of pouring resin into the mold, in which it is determined whether the resin flow end portion of the preform is completely impregnated with resin at least on the basis of the pressure of resin detected by the pressure sensor in the step of pouring resin into the mold.

In some embodiments, when a relation between a resin pouring time and the pressure of resin detected by the pressure sensor satisfies a predetermined condition, it is determined that the resin flow end portion of the preform is completely impregnated with resin.

In some embodiments, when the pressure of resin detected by the pressure sensor is higher than or equal to a predetermined value in the step of pouring resin in the mold, it is determined that the resin flow end portion of the preform is completely impregnated with resin.

In some embodiments, the method further includes: after a lapse of a predetermined time from resin-pouring start or after it is determined that the resin flow end portion of the preform is completely impregnated with resin, a step of moving the movable core in a direction to separate the movable core from the preform to form a gap as a resin flow path between the resin flow end portion of the preform and the movable core, and flowing resin into the gap; and a step of bringing the movable core close to the resin flow end portion of the preform again.

In some embodiments, the mold includes a first mold including the movable core and a second mold; and in the step of placing the preform in the mold, the preform is placed between the first mold and the second mold so as to define a first gap between the first mold and the preform and a second gap between the second mold and the preform, the second gap being larger than the first gap, the method further including in the step of pouring resin into the mold, a step of bringing the second mold close to the preform for compressive filling with the resin in the mold.

In some embodiments, after bringing the second mold close to the preform for compressive filling with the resin in the mold or while bringing the second mold close to the preform for compressive filling with the resin in the mold, the movable core is moved in a direction to separate the movable core from the resin flow end portion of the preform from a state where the movable core is pressed against the resin flow end portion of the preform.

According to another aspect of the present disclosure, there is disclosed a device for manufacturing a fiber reinforced resin molded article to form a preform including a fiber layer on an outer surface of a liner, impregnate the fiber layer of the preform with resin, and cure the resin, and the device includes: a mold having a movable core disposed therein, the movable core having a pressure sensor for detecting a pressure of resin flowing in the mold and being movable relative to the preform at a position facing a resin flow end portion of the preform; a driving mechanism configured to drive the movable core; a resin pouring mechanism configured to pour resin into the mold; and a control device configured to obtain the pressure of resin detected by the pressure sensor and control operating states of the driving mechanism and the resin pouring mechanism, the control device being configured to control the driving mechanism to place the preform in the mold while the movable core is pressed against the resin flow end portion of the preform; control the resin pouring mechanism to pour resin into the mold; and determine whether the resin flow end portion of the preform is completely impregnated with resin at least on the basis of the pressure of resin detected by the pressure sensor in the pouring of resin into the mold.

In some embodiments, when a relation between a resin pouring time and the pressure of resin detected by the pressure sensor satisfies a predetermined condition, the control device determines that the resin flow end portion of the preform is completely impregnated with resin.

In some embodiments, when the pressure of resin detected by the pressure sensor is higher than or equal to a predetermined value in the pouring of resin in the mold, the control device determines that the resin flow end portion of the preform is completely impregnated with resin.

In some embodiments, after a lapse of a predetermined time from resin-pouring start or after the control device determines that the resin flow end portion of the preform is completely impregnated with resin, the control device controls the driving mechanism to move the movable core in a direction to separate the movable core from the preform to form a gap as a resin flow path between the resin flow end portion of the preform and the movable core and flow resin into the gap, and then bring the movable core close to the resin flow end portion of the preform again.

In some embodiments, the mold includes a first mold including the movable core and a second mold; and the control device is configured to control the driving mechanism to place the preform between the first mold and the second mold so as to define a first gap between the first mold and the preform and a second gap between the second mold and the preform, the second gap being larger than the first gap, control the resin pouring mechanism to pour resin into the mold, and control the driving mechanism to bring the second mold close to the preform for compressive filling with the resin in the mold.

In some embodiments, after the control device controls the driving mechanism to bring the second mold close to the preform for compressive filling with the resin in the mold or while the control device controls the driving mechanism to bring the second mold close to the preform for compressive filling with the resin in the mold, the control device controls the driving mechanism to move the movable core in a direction to separate the movable core from the resin flow end portion of the preform from a state where the movable core is pressed against the resin flow end portion of the preform.

According to one aspect of the present disclosure, for example, when the relation between the resin pouring time and the pressure of resin detected by the pressure sensor satisfies a predetermined condition, or when the pressure of resin detected by the pressure sensor is higher than or equal to a predetermined value, it is determined that the resin flow end portion of the preform is completely impregnated with resin. This configuration can detect the state of resin impregnation in the fiber layer of the preform at the position corresponding to the resin flow end portion, and uniformly impregnate the fiber layer of the preform with the resin.

In addition, the movable core is moved relative to the preform (i.e., made closer to the preform after separated). This configuration can improve resin impregnation into the fiber layer of the preform at the position corresponding to the resin flow end portion into which resin hardly enters.

DETAILED DESCRIPTION

The following describes embodiments of the present disclosure, with reference to the attached drawings.

The following describes a high-pressure tank for fuel cell vehicles that is one example of a fiber reinforced resin molded article. The fiber reinforced resin molded article, to which the present disclosure is applied, is not limited to the high-pressure tank for fuel cell vehicles. The shape, the material, etc. of the liner and the preform of the fiber reinforced resin molded article are also not limited to the illustrated example.

The RTM method wraps (winds) carbon fiber around a liner multiple times (in multiple layers) to form a preform with a fiber layer on the outer surface of the liner, impregnates the fiber layer of the preform with epoxy resin, and cures the epoxy resin. In this way the RTM method manufactures a high-pressure tank for fuel cell vehicles including a fiber reinforced resin layer including the carbon fiber and the epoxy resin on the outer periphery of the liner. The liner is a hollow container made of resin (for example, nylon resin) that defines the inner space of the high-pressure tank.

In such a high-pressure tank for fuel cell vehicles, the carbon fiber is laminated thickly, and so the resin hardly enters into the inner layer of the carbon fiber and the resin flow end portion (i.e., a portion having resin flow last on the preform, that is, a portion which resin reaches at the latest timing on the preform). The high-pressure tank has a thick and large cylindrical shape, and so it is hard to uniformly charge resin into the entire tank, making the resin impregnation into the resin flow end portion ununiform. That is, the high-pressure tank for fuel cell vehicles has the carbon fiber that is laminated very thickly (about 10 times that of a typical RTM molded body component) to keep enough strength, and it is difficult to impregnate the fiber with resin. At the same time, as the tank has a large cylindrical shape, simple tank rotation as in JP 2019-056415 A does not exert a good effect of resin impregnation into the inner layer of the carbon fiber and the resin flow end portion. In addition, when resin is poured into the inner layer of the carbon fiber and the resin flow end portion for impregnation at high pressure, the quality and performance of the tank will deteriorate, such as deformation of the tank or fiber alignment disorder.

In addition, it is hard to test resin impregnation in a nondestructive testing during the process, and a resin impregnation defect may cause critical quality problems leading to the degradation of the tank performance.

To avoid this, the present embodiment has the following configuration.

[Manufacturing Device of High-Pressure Tank]

Figure 1:
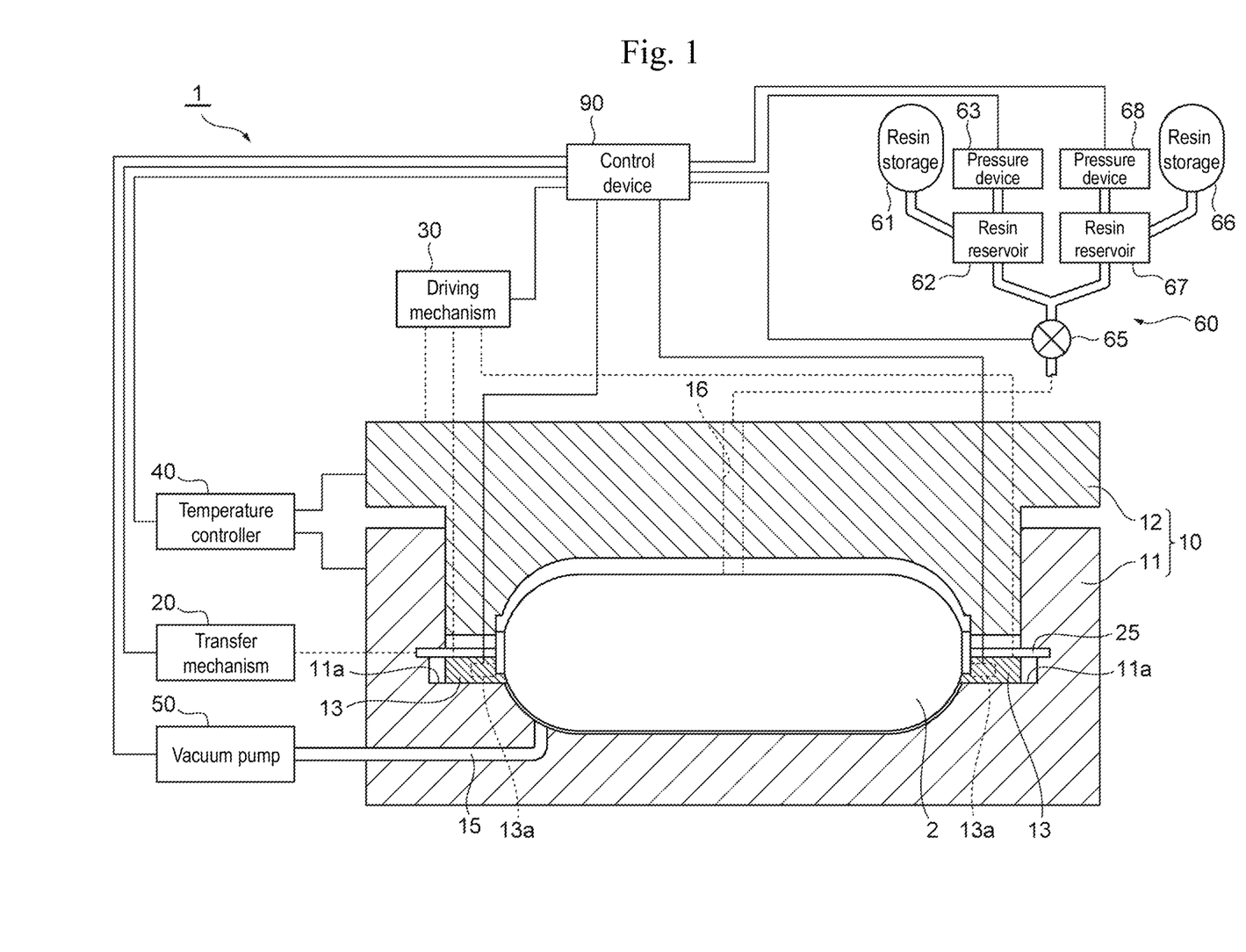
FIG. 1 is a vertical cross-sectional view of a manufacturing device of a high-pressure tank (fiber reinforced resin molded article) according to an embodiment.
Figure 2:
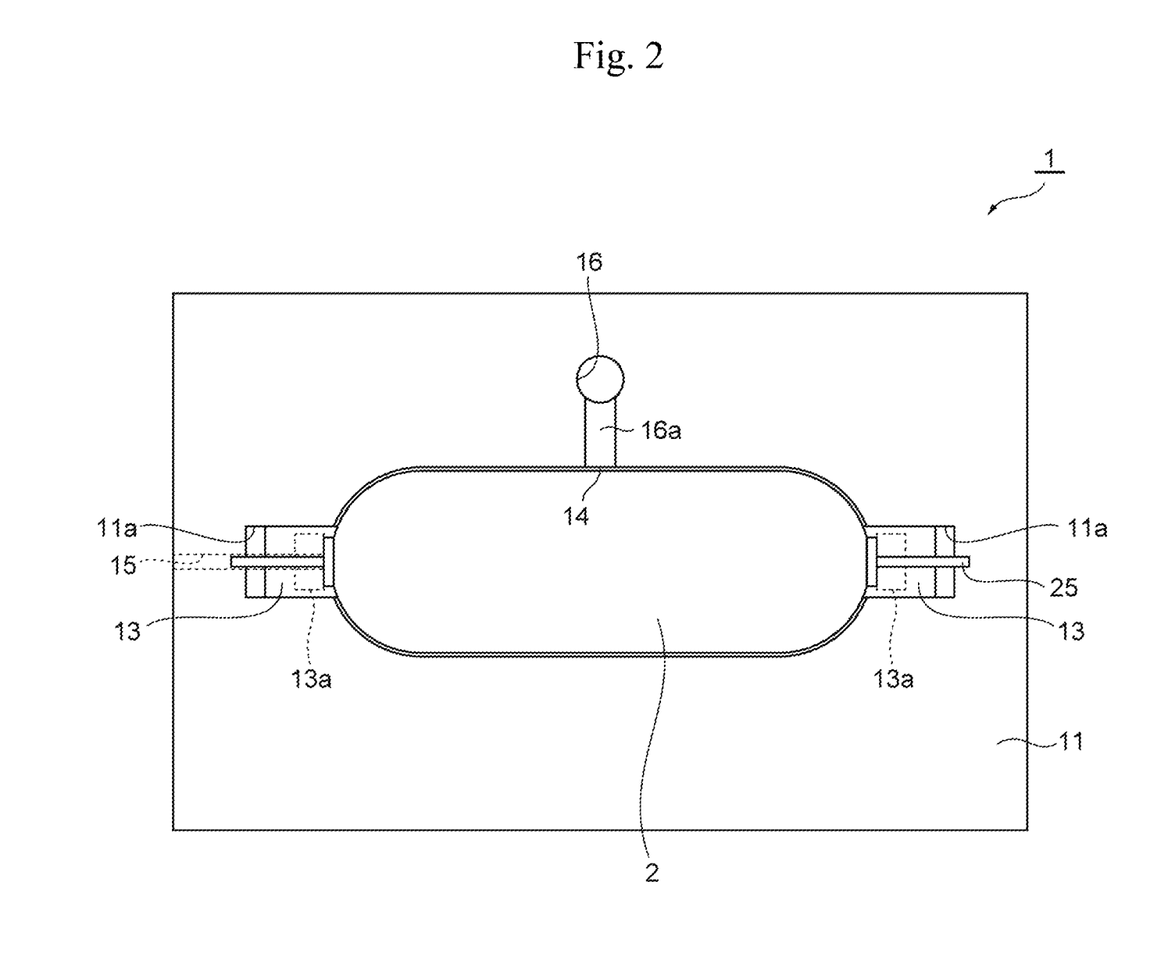
FIG. 2 is a top view of a lower mold of the manufacturing device of a high-pressure tank (fiber reinforced resin molded article), in which an upper mold is removed, according to the embodiment.

FIG. 1 and FIG. 2 show a manufacturing device of a high-pressure tank that is one example of a fiber reinforced resin molded article according to an embodiment. FIG. 1 is a vertical cross-sectional view and FIG. 2 is a top view of a lower mold in which an upper mold is removed.

A preform 2 as an intermediate body of the high-pressure tank to be manufactured in the present embodiment includes a liner and a fiber layer formed on the outer surface of the liner to be integrated with the liner. The liner is a resin hollow container having a gas barrier property and defining an inner space of the high-pressure tank. In one example, the fiber layer has a thickness of about 10 mm to 30 mm. The fiber layer is formed by wrapping fibers around the outer surface of the liner multiple times by the filament winding method.

Examples of the fiber wound around the liner include carbon fiber, glass fiber, and aramid fiber. The fibers may include continuous fibers, or include long fibers or short fibers. As described later, the fiber (layer) wound around the liner is impregnated with resin and cured to form a fiber reinforced resin layer that coats the periphery of the liner. Examples of the resin include thermosetting resins, such as epoxy resins, unsaturated polyester resins, and polyamide resins, and thermoplastic resins, such as polyethylene resins and polyester resins.

Figure 5:
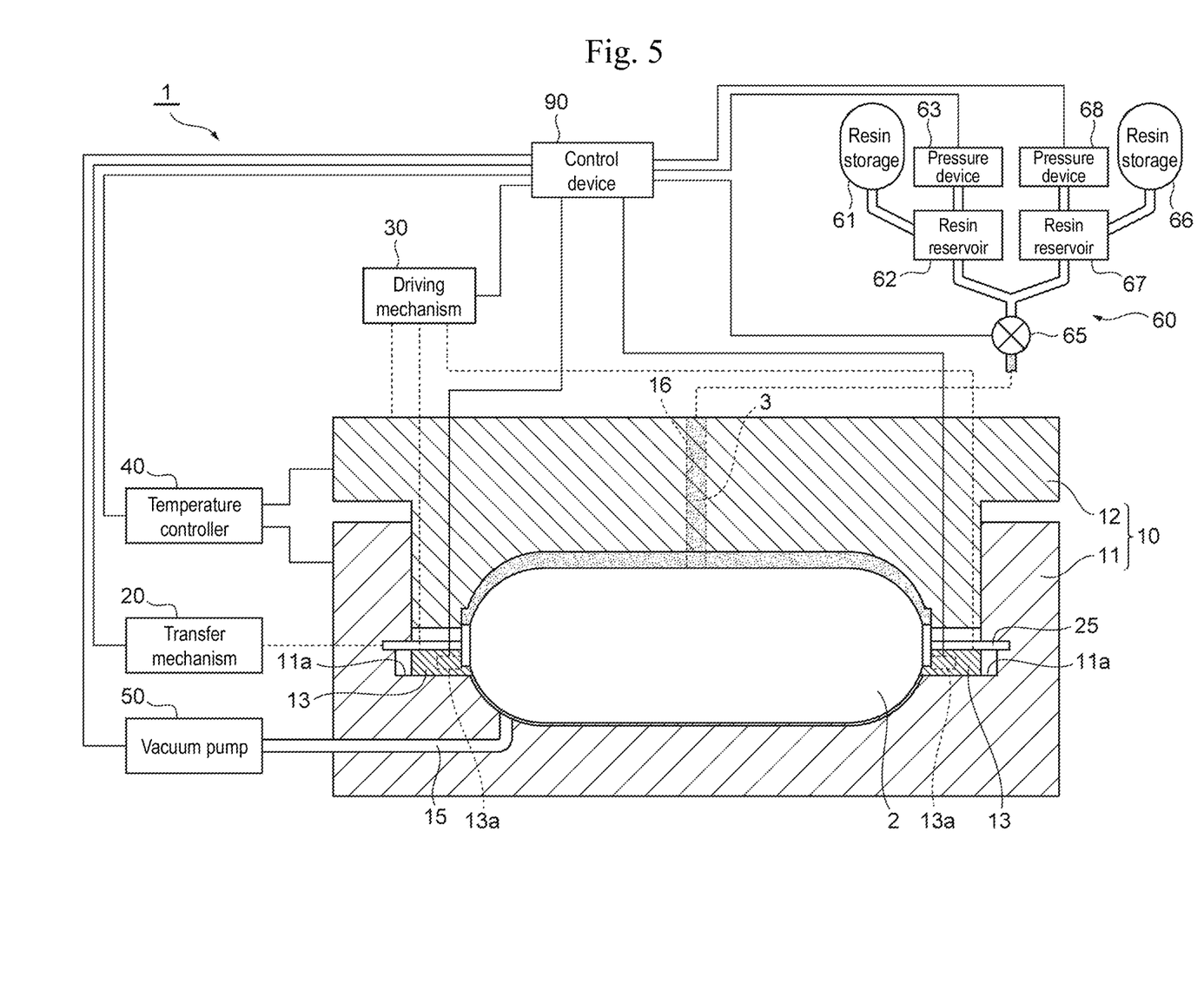
FIG. 5 is a vertical cross-sectional view of the manufacturing device of a high-pressure tank, showing a resin pouring step according to the embodiment.

The manufacturing device 1 is configured to manufacture a high-pressure tank by the RTM method to impregnate the fiber layer making up the preform 2 with resin 3 (reference numeral is shown in FIG. 5, for example) and cure the impregnated resin 3.

In one example, the manufacturing device 1 includes a mold 10 made up of a plurality of molds, such as a lower mold 11 as a fixed mold and an upper mold 12 as a moving mold. Closing of these lower mold 11 and upper mold 12 (this may be called mold clamping) defines a cavity for the fiber reinforced resin layer. To place the preform 2 having the lamination of fiber in the mold 10, the cavity of the mold 10 is made larger by the tolerance of the preform 2, for example.

This embodiment includes the lower mold 11 as a fixed mold and the upper mold 12 as a moving mold (a mold that is movable relative to the fixed mold). In another embodiment, the upper mold 12 may be a fixed mold and the lower mold 11 may be a moving mold, or both of the lower mold 11 and the upper mold 12 may be movable. The mold 10 in this embodiment includes two parts of the lower mold 11 and the upper mold 12, which may be three or more of parts.

In the mold 10, the preform 2 is supported by a shaft 25 that is disposed along the axis of the liner. That is, the shaft 25 constitutes a support mechanism that supports the preform 2 in the mold 10 (in the cavity).

A vacuum degassing pipe 15 is embedded in the mold 10 (in the lower mold 11 in the illustrated example). The vacuum degassing pipe 15 connects to a vacuum pump 50. The vacuum pump 50 operates to degas (evacuate) the mold 10 (the cavity) via the vacuum degassing pipe 15. That is, the vacuum pump 50 and the vacuum degassing pipe 15 constitute a vacuum degassing mechanism for vacuum degas of the mold 10 (the cavity).

A resin pouring pipe (this may be called a resin pouring gate) 16 is embedded in the mold 10. The resin pouring pipe 16 connects to a resin injector 60. The resin injector 60 pours (supplies) resin 3 into the mold 10 (cavity) (via a gate 14, which will be described later) through the resin pouring pipe 16 (described in detail later). In one example, the resin 3 is a two-component thermosetting epoxy resin composed of a base resin and a curing agent. The resin injector 60 therefore includes a resin storage 61, a resin reservoir 62, and a pressure device 63 for the base resin, a resin storage 66, a resin reservoir 67, and a pressure device 68 for the curing agent, and a valve 65 to supply the resin 3, which is a mixture of the base resin and the curing agent, to the resin pouring pipe 16.

In this example, the resin pouring pipe 16 extends from the upper mold 12 toward the lower mold 11. As shown in FIG. 2, the lower mold 11 is provided with a runner 16a, which forms the gate (resin inlet) 14 that is open to the cavity, so as to be continuous to the resin pouring pipe 16. In this example, the gate 14 is at a position facing a central portion (in the axial direction) of the preform 2. In this example, therefore, the opposite end portions (in the axial direction) of the preform 2 each form the resin flow end portion having the resin flow last on the preform 2, and a pair of movable cores 13, 13, which will be described later, is provided at the positions facing the resin flow end portions of the preform 2. It should be noted that in this example, the opposite end portions (in the axial direction) of the preform 2 form the resin flow end portions with respect to the position of the gate 14. As described above, however, the resin flow end portion is assumed to be the portion having the resin flow last on the preform 2, that is, the portion which resin reaches at the latest timing on the preform 2. The resin flow end portion is not limited to the opposite end portions (in the axial direction) of the preform 2 as in the illustrated example.

The resin 3 flowing through the resin pouring pipe 16 flows through the runner 16a. This allows the resin injector 60 to pour (supply) the resin 3 through the resin pouring pipe 16 and the runner 16a into the mold 10 (into the cavity) from the gate 14 at the center. That is, the resin injector 60, the resin pouring pipe 16, and the runner 16a constitute a resin pouring mechanism for pouring the resin 3 into the mold 10 (into the cavity).

A pair of mounting grooves 11a, 11a, which extends along the axis of the liner, is formed at the positions facing the opposite end portions (in the axial direction) of the preform 2 in the lower mold 11. The mounting grooves 11a, 11a each have the movable core 13 with a pressure sensor, which forms part of the cavity and is movable (in the horizontal direction) relative to the preform 2 placed in the mold 10 (i.e., made close to or separated from the preform 2). That is, the movable cores 13, 13 are located facing the preform 2 placed in the mold 10, and the surfaces (inner surfaces) of the movable cores 13, 13 facing the preform 2 serve as cavity surfaces that define the cavity together with the lower mold 11 (or the cavity surface thereof). In addition, bringing the movable cores 13, 13 close to the preform 2 in the mounting grooves 11a, 11a can press the movable cores 13, 13 (or the inner surfaces thereof) against the opposite end portions (surfaces) of the preform 2, and bringing the movable cores 13, 13 separated from the preform 2 can form a gap (a gap forming a resin flow path) of a predetermined width between each of the movable cores 13, 13 and the preform 2 (this will be described later).

In addition, the movable core 13 disposed in the lower mold 11 has a pressure sensor 13a embedded therein to detect a pressure of the resin 3 flowing at each of the opposite end portions (in the axial direction) of the preform 2 in the mold 10, that is, the resin flow end portion. Pressure information (resin pressure) obtained by the pressure sensor 13a is input to a control device 90, which will be described later. The control device 90 can detect the pressure of the resin 3 flowing at the resin flow end portion of the preform 2 on the basis of the pressure information (resin pressure) obtained by the pressure sensor 13a. The control device 90 detects and determines that the fiber layer in the resin flow end portion of the preform 2 is completely impregnated with the resin 3, for example, when the pressure of the resin 3 obtained by the pressure sensor 13a is higher than or equal to a predetermined threshold. The control device 90 can also control the operating state of the movable core 13 on the basis of the detection result.

The manufacturing device 1 includes: a transfer mechanism 20 to transfer the preform 2 to a predetermined position; a driving mechanism 30 to drive the mold 10 (specifically, the upper mold 12) in the direction to open and close the mold (vertical direction) and drive the pair of movable cores 13, 13 in the direction to open and close the pair of movable cores 13, 13 (horizontal direction); a temperature controller 40 to control the temperature of the mold 10 (lower mold 11, upper mold 12); and the control device 90 as a controller to control the operating state of the entire manufacturing device 1 (specifically, the operating states of the transfer mechanism 20, the driving mechanism 30, the temperature controller 40, the vacuum pump 50 in the vacuum degassing mechanism, and the pressure devices 63 and 68 and the valve 65 of the resin injector 60 in the resin pouring mechanism, etc.).

[Method for Manufacturing a High-Pressure Tank]

Figure 3:
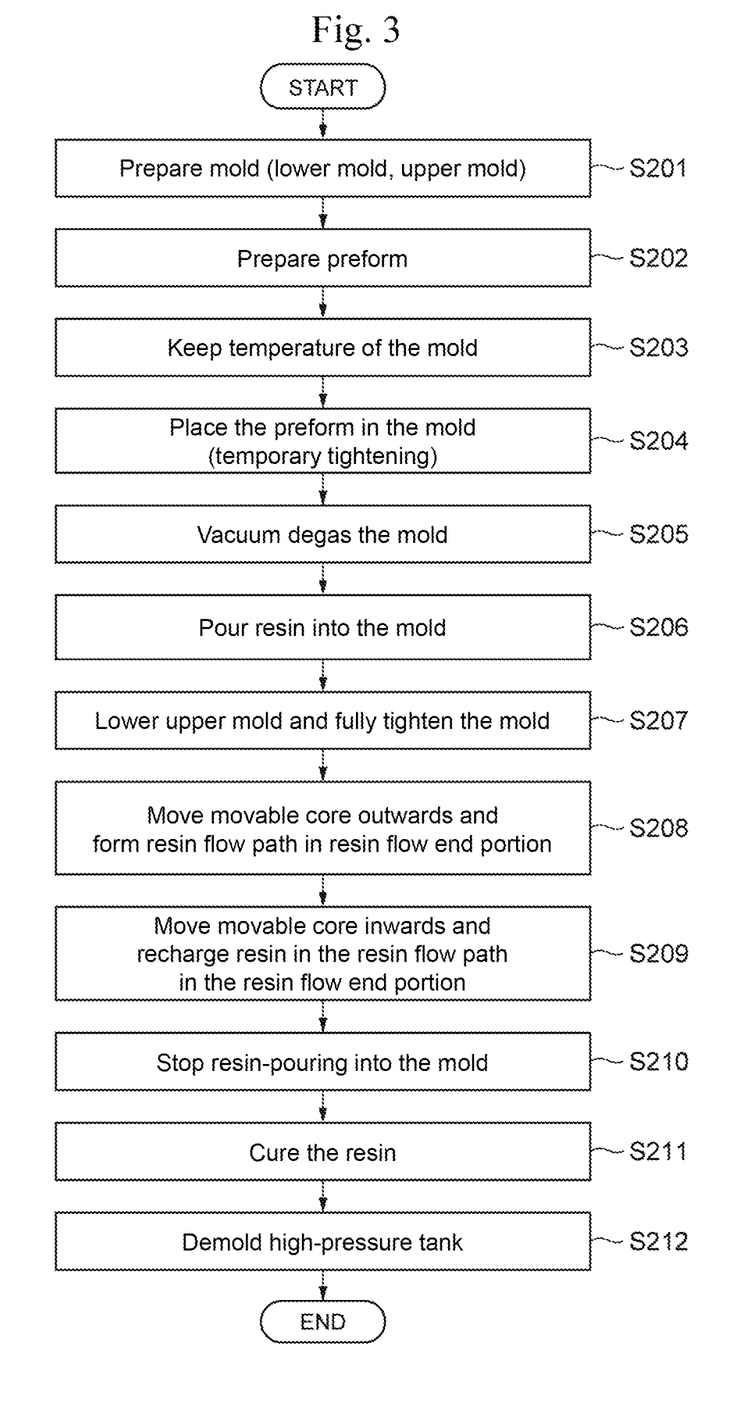
FIG. 3 is a flowchart of a method for manufacturing a high-pressure tank (fiber reinforced resin molded article) according to the embodiment.

FIG. 3 is a flowchart illustrating a method for manufacturing a high-pressure tank that is an example of the fiber reinforced resin molded article according to the embodiment. FIG. 4 to FIG. 8 are vertical cross-sectional views respectively showing a preform placing step and a vacuum degassing step; a resin pouring step; a fully tightening step and a movable core separating step; a movable core approaching step; and a resin-pouring stop step and a resin curing step. FIG. 9 is a graph showing a favorable resin impregnation condition on the basis of the relation between a resin pouring time and a resin pressure obtained by a pressure sensor.

(Mold Preparation Step: S201)

Firstly, the method prepares the mold 10 including the lower mold 11 and the upper mold 12 having the above-described structure. The lower mold 11 includes the movable core 13 with the pressure sensor 13a.

(Preform Preparation Step: S202)

As described above, the method prepares the preform 2 beforehand, in which a fiber layer is formed by wrapping (winding) fiber around the outer surface of the liner.

(Mold Temperature-Retention Step: S203)

Next, the method makes the control device 90 control the temperature controller 40 so as to keep the temperature of the mold 10 (lower mold 11, upper mold 12) to a predetermined temperature. When the resin 3 is a thermosetting resin, this predetermined temperature is equal to or higher than the curing temperature of the resin 3.

The method in this example keeps the temperature of the mold 10 to be the curing temperature of the resin 3 or higher at the beginning. In another example, the temperature of the mold 10 may be kept to be less than the curing temperature of the resin 3 at the beginning, and at an appropriate timing in a step described later (e.g., after fully tightening of the mold 10), the temperature of the mold 10 may be kept to be the curing temperature or higher of the resin 3.

(Preform Placing Step: S204)

Figure 4:
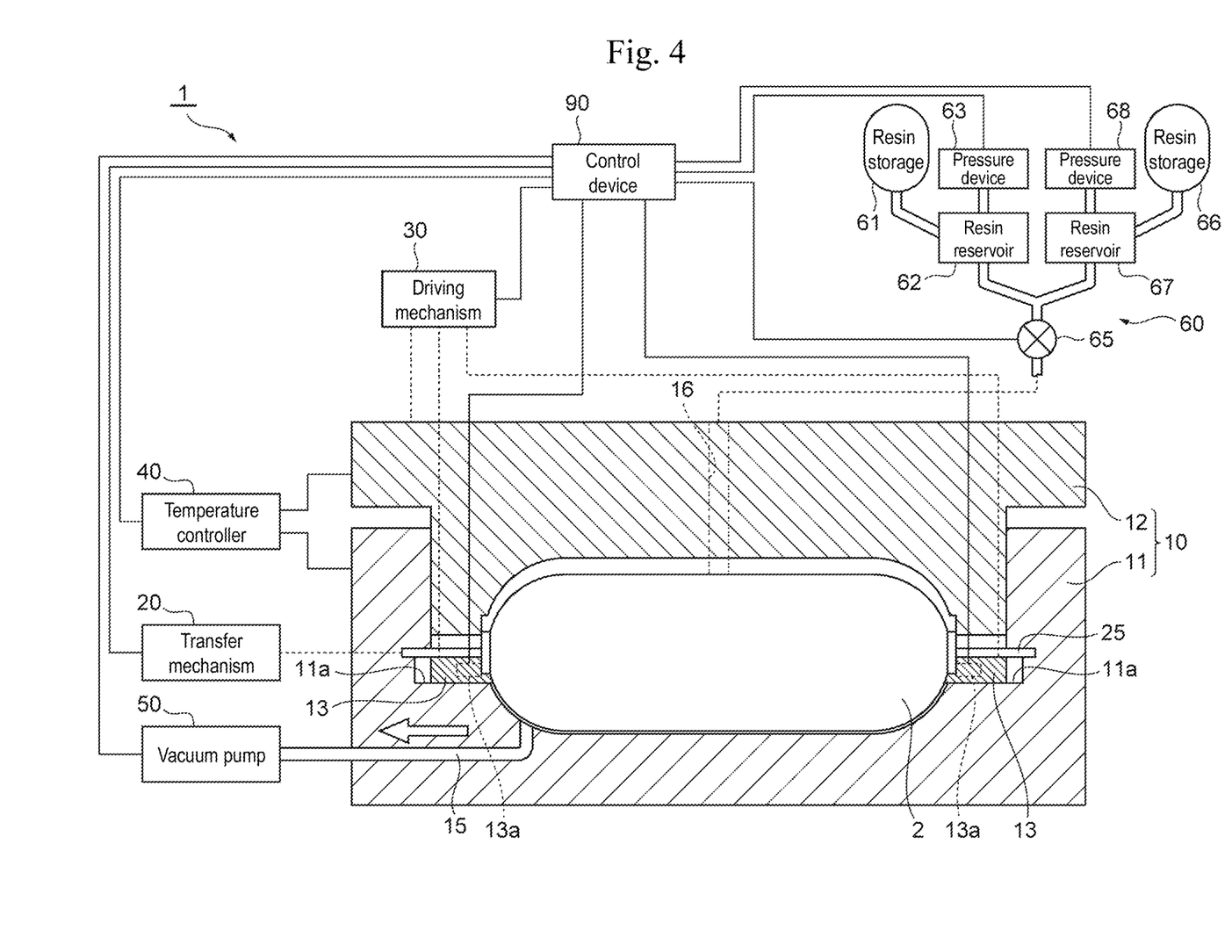
FIG. 4 is a vertical cross-sectional view of the manufacturing device of a high-pressure tank, showing a preform placing step and a vacuum degassing step according to the embodiment.

Subsequently, the control device 90 controls the transfer mechanism 20 and the driving mechanism 30 to place the preform 2 in the mold 10 (that is, between the lower mold 11 and the upper mold 12) (FIG. 1, FIG. 4). Specifically, while opening the upper mold 12, the transfer mechanism 20 places the preform 2 on the lower mold 11 under the control of the control device 90. At this time, the shaft 25 supports the preform 2. The driving mechanism 30 moves the movable cores 13 disposed in the lower mold 11 inwards (toward the preform 2) and presses the movable cores 13 against the opposite end portions of the preform 2 under the control of the control device 90. After that, the driving mechanism 30 starts mold clamping under the control of the control device 90 and temporarily tightens the upper mold 12. Temporary tightening is an intermediate state between the state where the upper mold 12 is open and the fully tightening state, and the lower mold 11 and the upper mold 12 has a gap therebetween in the temporary tightening state. As shown in FIG. 4, the upper mold 12 moves to a position having a gap (second gap) of several mm with the preform 2. This gap (second gap) between the upper mold 12 and the preform 2 is larger than a gap (first gap) between the lower mold 11 and the preform 2.

It should be noted that instead of moving the movable cores 13 inwards and pressing the movable cores 13 against the opposite end portions of the preform 2 and then starting mold clamping for the temporarily tightening of the upper mold 12 as described above, the movable cores 13 may be moved inwards and pressed against the opposite end portions of the preform 2 after the temporarily tightening of the upper mold 12.

(Vacuum Degassing Step: S205)

Next, the control device 90 controls the vacuum pump 50 while keeping the above-mentioned temporary tightening state (i.e., before completion of mold clamping) to degas the mold 10 (FIG. 4).

(Resin Pouring Step: S206)

After stopping (or completion of) the above-stated vacuum degassing, the resin 3 is injected/poured into the mold 10 (FIG. 5). Specifically, the control device 90 opens the valve 65, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. This lets the (uncured) resin 3 flow through the resin pouring pipe 16 that extends from the upper mold 12 to the lower mold 11, so that the resin 3 is injected/poured toward the preform 2 from the gate (in the illustrated example, the gate at the central portion of the preform 2) 14 through the runner 16*a*. Since the upper mold 12 is temporarily tightened, the resin 3 is injected and poured mainly into the gap (second gap) between the upper mold 12 and the (upper face of) preform 2.

(Fully Tightening Step: S207)

Figure 6:
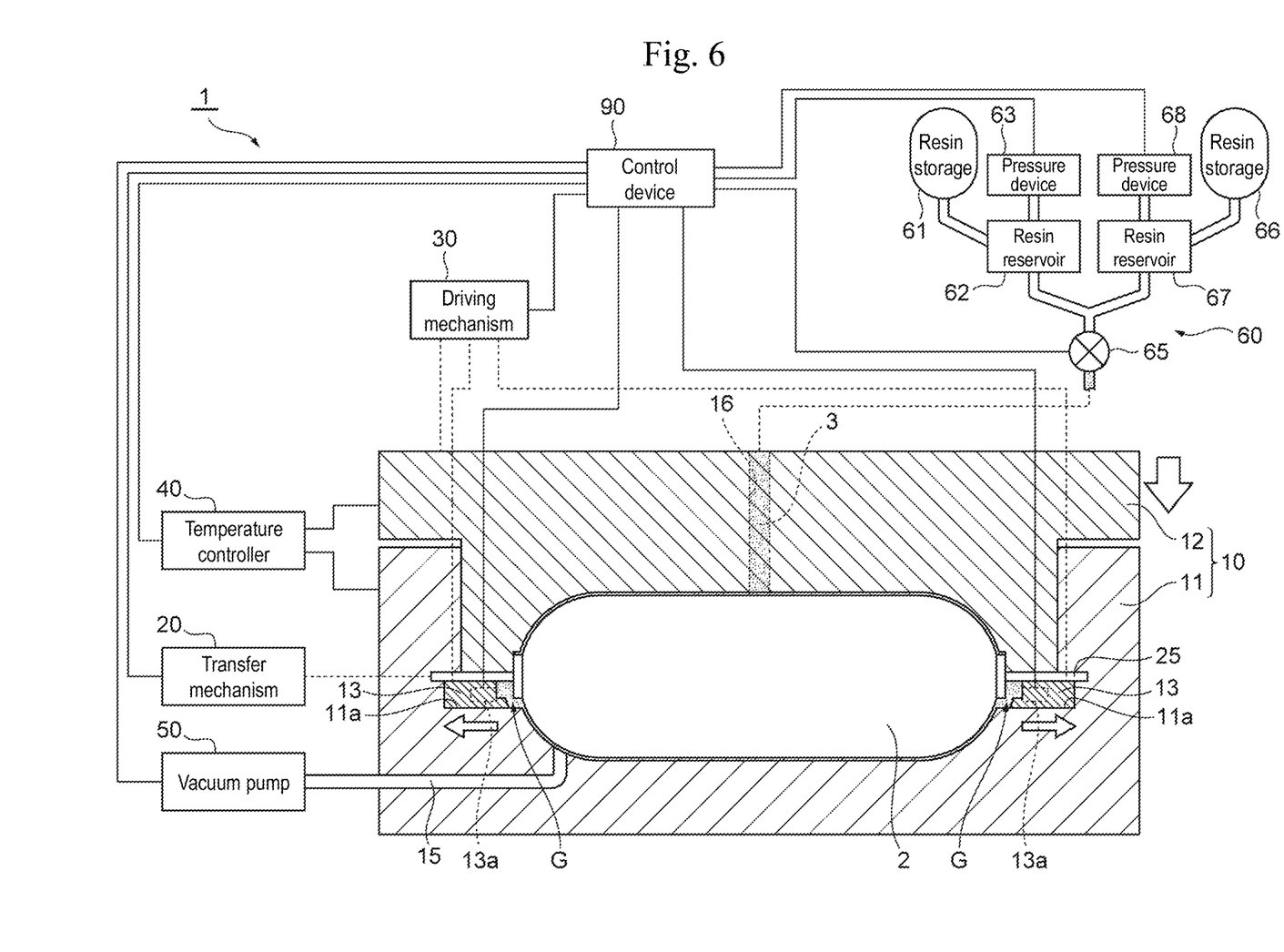
FIG. 6 is a vertical cross-sectional view of the manufacturing device of a high-pressure tank, showing a fully tightening step and a movable core separating step according to the embodiment.

Next, the control device 90 controls the driving mechanism 30 to lower the upper mold 12 to the lower end to completely close the mold (i.e., bring it closer to the preform 2) and completely close (fully tightening) the upper mold 12 and the lower mold 11 (FIG. 6). This keeps compressive filling with the resin 3 in the mold 10 uniform, and allows impregnation with the resin 3 in the lamination of the fiber layer of the preform 2 (in particular, in the portion of the preform 2 other than the opposite end portions against which the movable cores 13 are pressed).

(Movable Core Separating Step: S208)

After a lapse of a predetermined time from resin-pouring start and fully tightening (that is, at a predetermined timing), the control device 90 controls the driving mechanism 30 to move the movable cores 13 outwards (i.e., to move the movable cores 13 separated from the preform 2) to form a gap G as a resin flow path of a predetermined width at each of the opposite end portions (resin flow end portions) of the preform 2, and flow the resin into the gap G (FIG. 6). Herein, the pressure of the resin 3 obtained by the pressure sensor 13*a* provided in the movable core 13 is sent to the control device 90, and the control device 90 detects and stores the pressure of the resin 3 received from the pressure sensor 13*a*.

The pressure of the resin 3 stored in the control device 90 can be used to determine favorable resin impregnation in the opposite end portions (resin flow end portions) of the preform 2 (i.e., whether the opposite end portions (resin flow end portions) of the preform 2 are completely impregnated with the resin 3), that is, to determine a tank quality. Specifically, the control device 90 retains a favorable resin impregnation condition shown in FIG. 9, and if the pressure of the resin 3 received from the pressure sensor 13*a* is included in a favorable condition area shown in FIG. 9 in relation with a resin pouring time, the control device 90 determines that resin impregnation in the resin flow end portion of the preform 2 is favorable and determines that a high-pressure tank 4 (FIG. 8) manufactured in the ongoing flow is a good item. Meanwhile, if the pressure of the resin 3 received from the pressure sensor 13*a* is not included in the favorable condition area shown in FIG. 9 in relation with the resin pouring time, the control device 90 determines that resin impregnation in the resin flow end portion of the preform 2 is not favorable (incomplete impregnation or unusual high pressure) and determines that the high-pressure tank 4 (FIG. 8) manufactured in the ongoing flow is a bad item. If the high-pressure tank 4 is determined as a bad item, such a high-pressure tank 4 can be excluded from the manufacturing line in the step after the movable core separating step (S208) or in the step after the demolding step (S212), for example.

It should be noted that instead of fully tightening the upper mold 12 and the lower mold 11 and then moving the movable cores 13 outwards from the state where the movable cores 13 are pressed against the opposite end portions (resin flow end portions) of the preform 2 to form the gap G as a resin flow path at each of the opposite end portions of the preform 2 as described above, the movable cores 13 may be moved outwards from the state where the movable cores 13 are pressed against the opposite end portions (resin flow end portions) of the preform 2 while fully tightening the upper mold 12 and the lower mold 11, to form the gap G as a resin flow path at each of the opposite end portions of the preform 2. That is, before the fully tightening step (S207) ends, the movable core separating step (S208) may be performed.

(Movable Core Approaching Step: S209)

Figure 7:
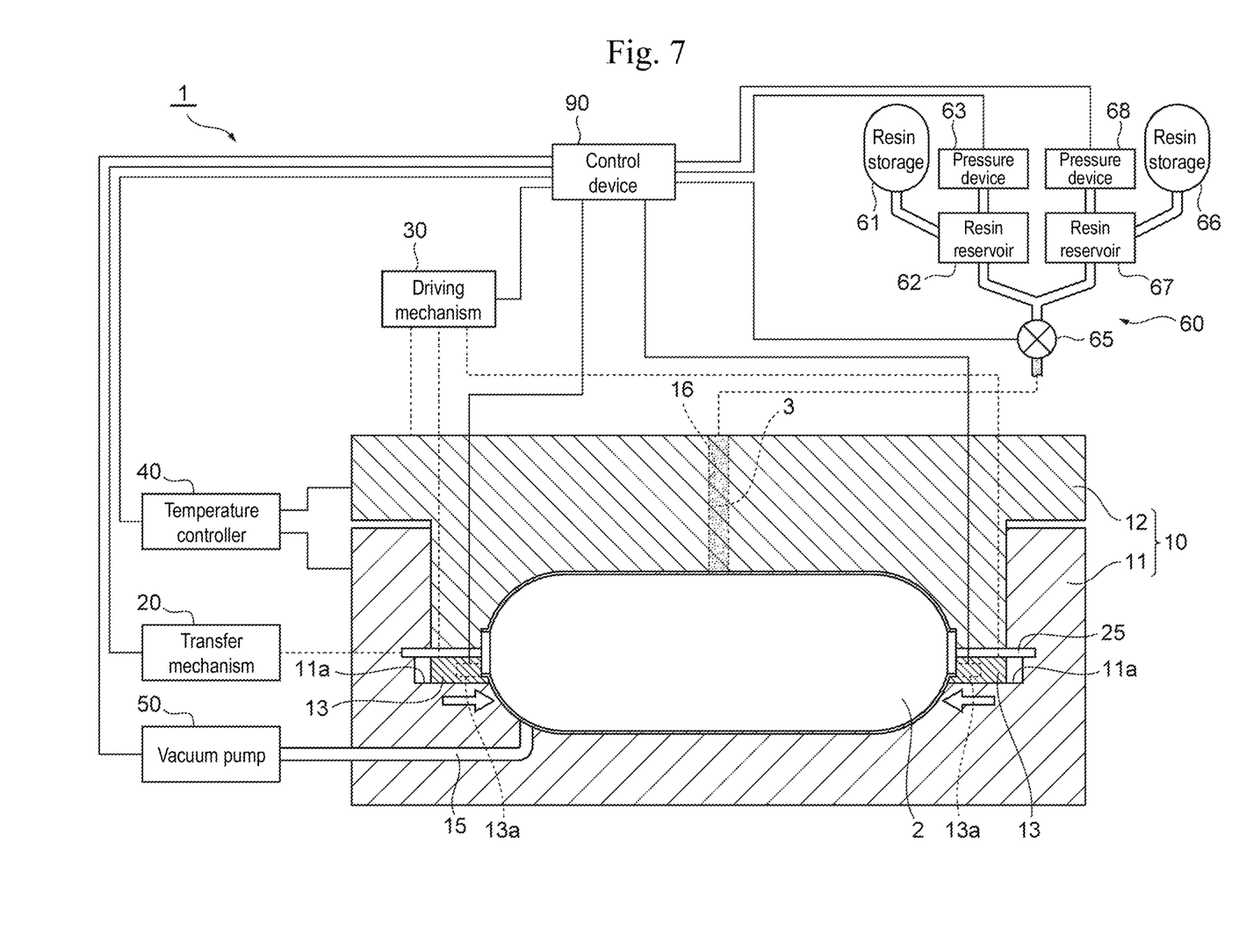
FIG. 7 is a vertical cross-sectional view of the manufacturing device of a high-pressure tank, showing a movable core approaching step according to the embodiment.

Next, after a lapse of a predetermined time, the control device 90 controls the driving mechanism 30 to move the movable cores 13 inwards (toward the preform 2) (that is, to bring the movable cores 13 close to the preform 2 again), and recharges (pressurizes and fills) the rein 3 in the gap G (resin flow path) formed at each of the opposite end portions (resin flow end portions) of the preform 2 into each of the opposite end portions (or the fiber layer thereof) of the preform 2 (FIG. 7). Herein, the moving timing of the movable cores 13 is set beforehand as an expected timing for the resin 3 to be charged into the resin flow paths at the opposite end portions of the preform 2.

(Resin-Pouring Stop Step: S210)

Then, after the movable cores 13 are completely closed and the fiber layer in the opposite end portions (resin flow end portions) of the preform 2 is completely impregnated with the resin 3 as described above, the pouring of the resin 3 stops (FIG. 8).

(Resin Curing Step: S211)

Figure 8:
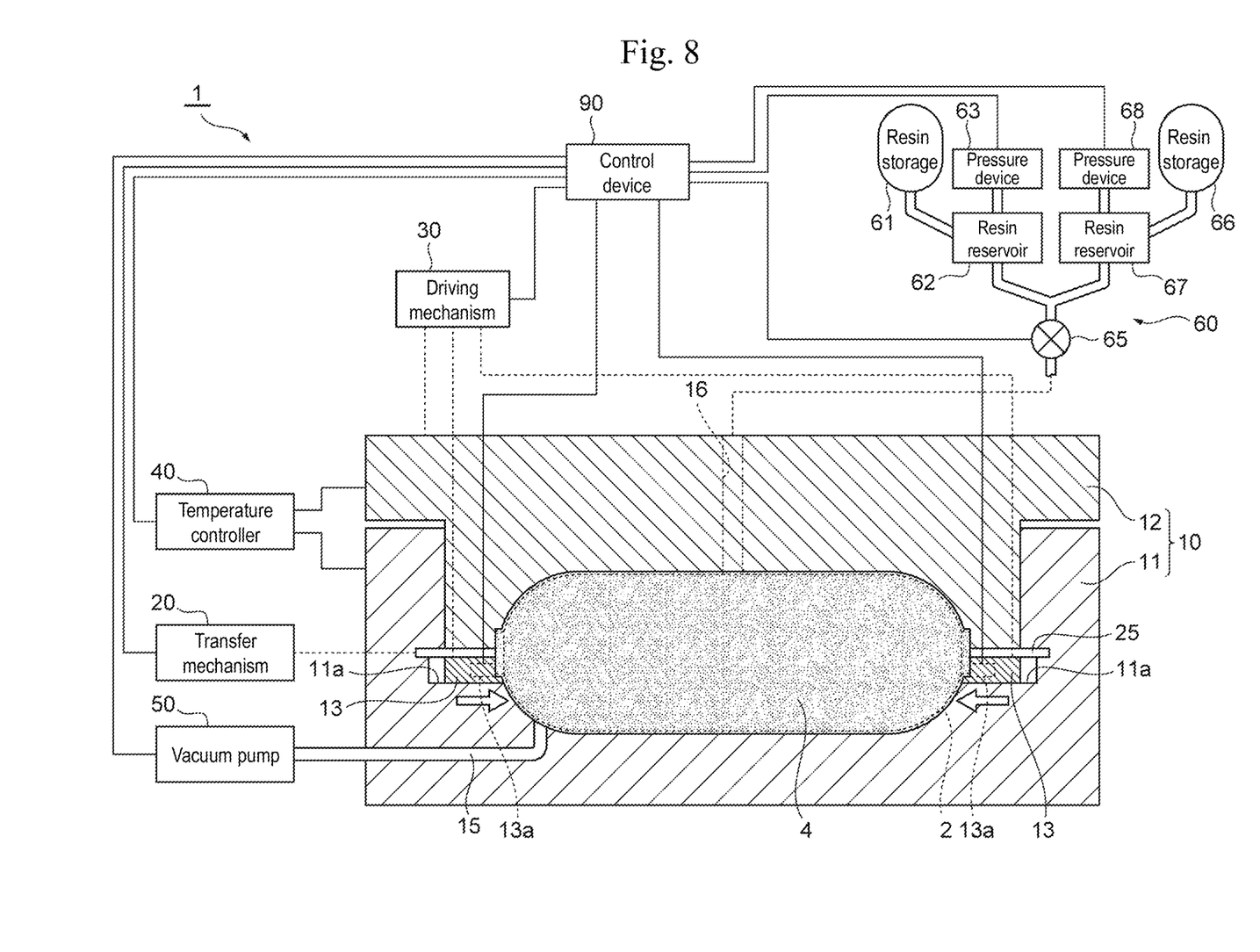
FIG. 8 is a vertical cross-sectional view of the manufacturing device of a high-pressure tank, showing a resin-pouring stop step and a resin curing step according to the embodiment.
Figure 9:
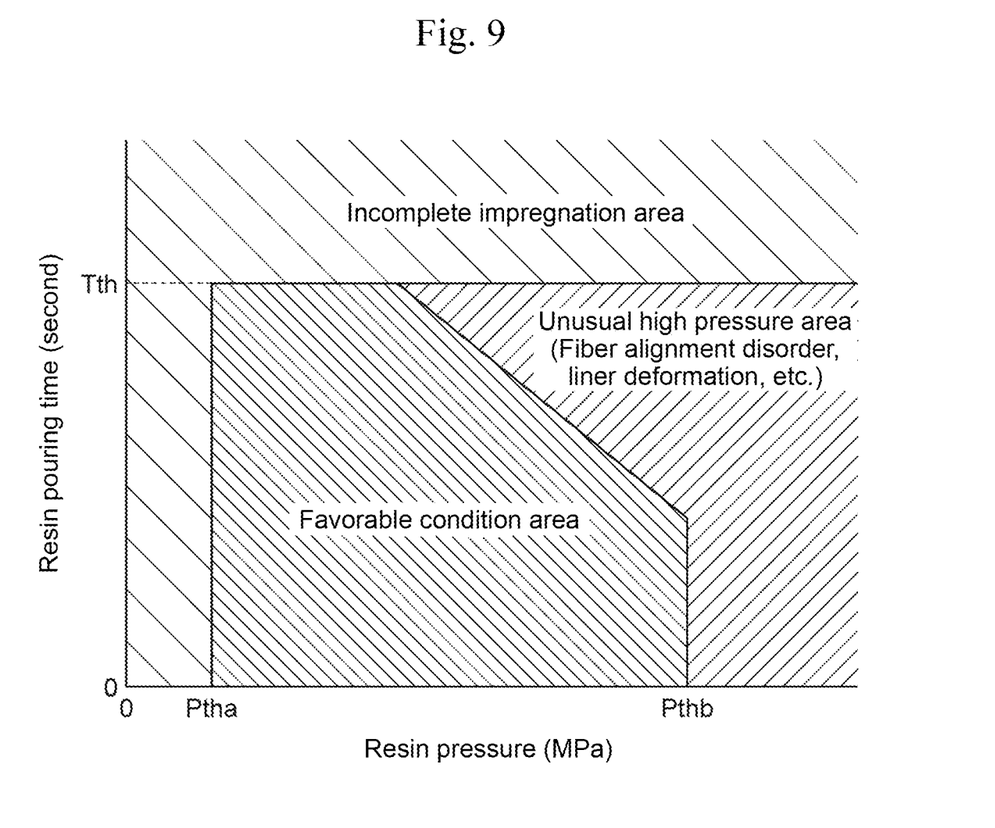
FIG. 9 is a graph showing a favorable resin impregnation condition on the basis of the relation between a resin pouring time and a resin pressure obtained by a pressure sensor.

After the pouring of the resin 3 stops as stated above, the method cures the resin 3 (FIG. 8).

(Demolding Step: S212)

After the resin 3 is cured, the control device 90 controls the driving mechanism 30 to open the upper mold 12. When the curing of the resin 3 ends, the high-pressure tank 4 having the fiber reinforced resin layer formed on the outer periphery of the liner is obtained.

As described above, when a high-pressure tank for fuel cell vehicles is manufactured by the RTM resin impregnation technology, it is needed to uniformly apply resin pressure and entirely charge and impregnate the thick and large tank with epoxy resin. However, it is hard to inspect resin impregnation during the process by a nondestructive testing, and once defective resin impregnation occurs, critical quality problems leading to the degradation of the tank performance may occur.

The present embodiment disposes the movable core 13 with the pressure sensor 13*a* at the resin flow end portion in the mold 10 to detect resin impregnation during the RTM resin impregnation, and detects the resin impregnation during the RTM resin impregnation.

In the RTM resin impregnation step, after the tank (preform 2) is set in the mold 10, the movable core 13 with the pressure sensor 13*a* is slid and pressed against the tank end portion. Then, when the mold is closed for the pouring and impregnation of epoxy resin, resin impregnation is detected with the pressure sensor 13*a* and the resin impregnation is determined with reference to a threshold, thereby inspecting the state of the resin impregnation. In addition, automatic management of the conditions for RTM resin impregnation may also be available by feedback-controlling the resin pressure in the resin flow end portion (that is, by referring to and using the resin pressure in the manufacturing of a high-pressure tank in the future).

In this way, by disposing the movable core 13 with the pressure sensor 13*a* at the resin flow end portion in the mold 10, the present embodiment can detect resin impregnation during the RTM resin impregnation. In addition, when the mold is closed for the pouring and impregnation of epoxy resin, resin impregnation is detected with the pressure sensor 13a and the resin impregnation is determined with reference to a threshold. Thus, the present embodiment can confirm the state of the resin impregnation and determine whether the manufactured tank is a good item. In addition, nondestructive and automatic management of the conditions for RTM resin impregnation may also be available by feedback-controlling the resin pressure in the resin flow end portion.

In addition, in order to increase a resin impregnation amount in the resin flow end portion during the RTM resin impregnation, the present embodiment disposes the movable core 13 at the resin flow end portion in the mold 10 and controls the resin impregnation amount according to the resin impregnation.

In the RTM resin impregnation step, after the tank (preform 2) is set in the mold 10, the movable core 13 at the resin flow end portion is slid and pressed against the tank end portion. Then, when the mold is closed for the pouring and impregnation of epoxy resin, the movable core 13 is temporarily moved so as to form a gap in the resin flow end portion into which resin hardly enters. After a resin flow path is formed, the movable core 13 is moved back (that is, made closer to the tank end portion), thereby increasing resin impregnation into the resin flow end portion, and then the resin 3 is cured. In addition, by incorporating the pressure sensor 13a into the slidable movable core 13 and by feedback-controlling the resin pressure in the resin flow end portion (that is, by referring to and using the resin pressure in the manufacturing of a high-pressure tank in the future), management of a volume of flow path formed by the movable core 13 as well as automatic management of the conditions for a resin charge amount may also be available.

In this way, by disposing the movable core 13 at the resin flow end portion in the mold 10, the present embodiment can increase a resin impregnation amount during the RTM resin impregnation. In addition, by incorporating the pressure sensor 13a into the slidable movable core 13 and by feedback-controlling the resin pressure in the resin flow end portion, automatic management of the conditions for the RTM resin impregnation may also be available.

Therefore, when a thick tank is formed by the RTM resin impregnation technology, the present embodiment can detect resin charge (impregnation) and improve resin impregnation into the resin flow end portion of the tank (preform 2), and thus can guarantee the resin impregnation during the process and obtain increased tank performance and excellent quality. This also allows inspection during the process and substantially increases productivity.

As described above, according to the present embodiment, when the relation between the resin pouring time and the pressure of the resin 3 detected by the pressure sensor 13a satisfies a predetermined condition, it is determined that the resin flow end portion of the preform 2 is completely impregnated with the resin 3. This configuration can detect the state of resin impregnation in the fiber layer of the preform 2 at the position corresponding to the resin flow end portion, and uniformly impregnate the fiber layer of the preform 2 with the resin.

In addition, the movable core 13 is moved relative to the preform 2 (i.e., made closer to the preform 2 after separated). This configuration can improve resin impregnation into the fiber layer of the preform 2 at the position corresponding to the resin flow end portion into which resin hardly enters.

Other Embodiment

As compared to the above-described embodiment, processing of the control device 90 (in particular, good item determination processing and a drive timing of the movable core 13 by the control device 90) may be modified as follows.

That is, in the above-described embodiment, in S208 (movable core separating step) shown in FIG. 3, the control device 90 controls the driving mechanism 30 to move the movable cores 13 outwards after a lapse of a predetermined time from the resin-pouring start and the fully tightening. Meanwhile, in S208 (movable core separating step) shown in FIG. 3, when the pressure of the resin 3 received from the pressure sensor 13a is higher than or equal to a predetermined threshold, the control device 90 may detect (determine) that the lamination in the opposite end portions (resin flow end portions) of the preform 2 is completely impregnated (charged) with the resin 3 and move the movable cores 13 outwards to form a gap G as a resin flow path of a predetermined width at each of the opposite end portions (resin flow end portions) of the preform 2, and flow the resin into the gap G. The flow of the other processing is the same as the above-described embodiment.

According to this embodiment, when the pressure of the resin 3 detected by the pressure sensor 13a is higher than or equal to the predetermined value, it is determined that the resin flow end portion of the preform 2 is completely impregnated with the resin 3. This configuration can detect the state of resin impregnation in the fiber layer of the preform 2 at the position corresponding to the resin flow end portion and can make the fiber layer of the preform 2 uniformly impregnated with the resin.

In addition, according to this embodiment, the control device 90 determines that the resin flow end portion of the preform 2 is completely impregnated with the resin during the process. This may increase the processing load of the control device 90 but produce an advantageous effect that only a high-pressure tank having a favorable resin impregnation state in the fiber layer of the preform 2 at the position corresponding to the resin flow end portion can be manufactured and delivered.

That is a detailed description of the embodiments of the present disclosure referring to the drawings. The specific configuration of the present disclosure is not limited to the above-stated embodiments, and the design may be modified variously without departing from the spirits of the present disclosure. The present disclosure covers such modified embodiments.

DESCRIPTION OF SYMBOLS

1 Manufacturing device of high-pressure tank (fiber reinforced resin molded article)
2 Preform
3 Resin
4 High-pressure tank (fiber reinforced resin molded article)
10 Mold
11 Lower mold (first mold)
11a Mounting groove
12 Upper mold (second mold)
13 Movable core
13a Pressure sensor
14 Gate
15 Vacuum degassing pipe (vacuum degassing mechanism)
16 Resin pouring pipe (resin pouring mechanism)
16a Runner (resin pouring mechanism)
20 Transfer mechanism
25 Shaft
30 Driving mechanism
40 Temperature controller

50 Vacuum pump (vacuum degassing mechanism)
60 Resin injector (resin pouring mechanism)
61, 66 Resin storage
62, 67 Resin reservoir
63, 68 Pressure device
65 Valve
90 Control device

What is claimed is:

1. A method for manufacturing a fiber reinforced resin molded article, the method including forming a preform including a fiber layer on an outer surface of a liner, impregnating the fiber layer of the preform with resin, and curing the resin, comprising:
    a step of preparing a mold having a movable core disposed therein, the movable core having a pressure sensor for detecting a pressure of resin flowing in the mold and being movable relative to the preform at a position facing a resin flow end portion of the preform;
    a step of placing the preform in the mold in a state where the movable core is pressed against the resin flow end portion of the preform;
    a step of pouring resin into the mold;
    after a lapse of a predetermined time from resin-pouring start or after it is determined that the resin flow end portion of the preform is completely impregnated with resin,
    a step of moving the movable core in a direction away from the preform to separate the movable core from the preform to form a gap as a resin flow path between the resin flow end portion of the preform and the movable core, and flowing resin into the gap; and
    a step of moving the movable core in a direction toward the preform to reduce the gap between the resin flow end portion of the preform and the movable core,
    wherein it is determined whether the resin flow end portion of the preform is completely impregnated with resin at least on the basis of the pressure of resin detected by the pressure sensor in the step of pouring resin into the mold.

2. The method for manufacturing a fiber reinforced resin molded article according to claim 1, wherein when a relation between a resin pouring time and the pressure of resin detected by the pressure sensor satisfies a predetermined condition, it is determined that the resin flow end portion of the preform is completely impregnated with resin.

3. The method for manufacturing a fiber reinforced resin molded article according to claim 1, wherein when the pressure of resin detected by the pressure sensor is higher than or equal to a predetermined value in the step of pouring resin in the mold, it is determined that the resin flow end portion of the preform is completely impregnated with resin.

4. The method for manufacturing a fiber reinforced resin molded article according to claim 1, wherein:
    the mold includes a first mold including the movable core and a second mold; and
    in the step of placing the preform in the mold, the preform is placed between the first mold and the second mold so as to define a first gap between the first mold and the preform and a second gap between the second mold and the preform, the second gap being larger than the first gap,
    the method further comprising
    in the step of pouring resin into the mold, a step of bringing the second mold toward the preform for compressive filling with the resin in the mold.

5. The method for manufacturing a fiber reinforced resin molded article according to claim 4, wherein
    after bringing the second mold toward the preform for compressive filling with the resin in the mold or while bringing the second mold toward the preform for compressive filling with the resin in the mold,
    the movable core is moved in a direction to separate the movable core from the resin flow end portion of the preform from a state where the movable core is pressed against the resin flow end portion of the preform.

* * * * *